April 10, 1928.
A. Y. DODGE
1,665,690
BRAKE SHOE
Filed March 23, 1927
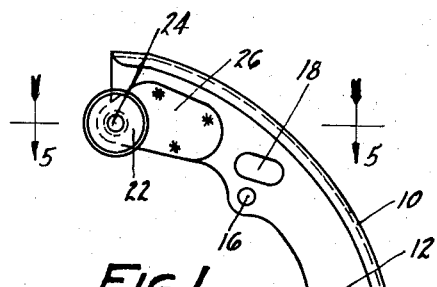
FIG.1
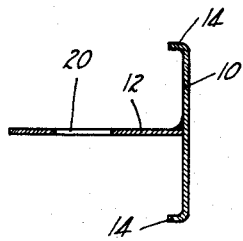
FIG.2
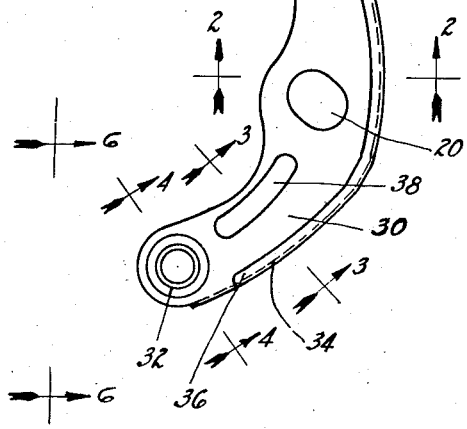
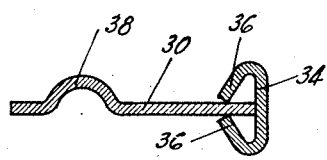
FIG.3
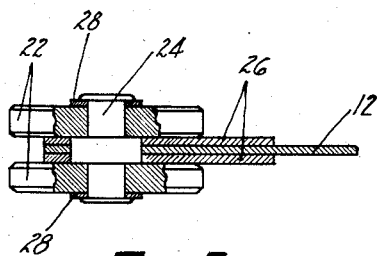
FIG.4   FIG.5
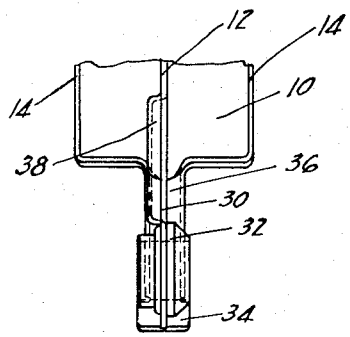
FIG.6
INVENTOR
ADIEL Y. DODGE
BY
M. W. McConkey
ATTORNEY Patented Apr. 10, 1928.

1,665,690

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed March 23, 1927. Serial No. 177,547.

This invention relates to brake shoes, and is illustrated as embodied in an auxiliary shoe for a three-shoe internal expanding automobile brake. An object of the invention is to provide a very light but strong shoe, by the use of novel reinforcing means for those parts of the shoe which are subject to the greatest strains.

The outer edge of the pivot or anchor arm at the end of the shoe may advantageously be reinforced by continuing along the outer edge of this arm a narrowed integral extension of the arcuate band which forms the friction face of the shoe. I prefer to form this extension with one or a pair of integral side wings bent into supporting engagement with the sides of the arm, to which they may be welded or otherwise secured.

The greatest buckling strain in a shoe of this character comes along the inner edge of this projecting arm, usually approximately midway between the end of the friction face and the pivot or anchor at the end of the shoe. According to an important feature of the invention, this part of the arm is provided with auxiliary reinforcing means, extending lengthwise of the arm, and preferably formed by embossing or pressing an integral rib in the arm itself.

An improved mounting for cam-engaging thrust rollers at the end of the shoe, and other novel and desirable features of construction, will be apparent from the following description of one illustrative embodiment of the invention shown in the accompanying drawing, in which:

Figure 1 is a side elevation of the shoe;

Figure 2 is a section through the shoe on the line 2—2 of Figure 1;

Figure 3 is a section through the shoe on the line 3—3 of Figure 1, showing the reinforcement of the projecting arm;

Figure 4 is a section on the line 4—4 of Figure 1, showing the bushing for the pivot or anchor;

Figure 5 is a partial section on the line 5—5 of Figure 1, showing the mounting at one end of the shoe of a pair of cam-engaging thrust rollers; and Figure 6 is a partial inside elevation of the lower part of the shoe, looking in the direction of the arrows 6—6 in Figure 1.

The illustrated shoe is intended for use as the auxiliary shoe of a three-shoe brake constructed generally as described in Patent No. 1,628,388, granted Bendix Brake Company on May 10, 1927, on application of John R. Cautley. This particular shoe includes an outer arcuate band or rim 10, to which the brake lining is riveted and which forms the friction face of the shoe, and a separate stiffening member or web 12 arc-welded or otherwise secured along its outer face to the inner face of the band 10. Band 10 may, if desired, have stiffening flanges 14 at its opposite edges.

Web 12 is formed with an opening 16 for the attachment of a return spring, an opening 18 for a steady rest, and a relatively large opening 20 for the anchor of an adjacent shoe arranged as described in the above-identified Cautley patent. As the opening 20 is relatively large, and in order to prevent any possibility of weakening the web 12 at this point, I prefer to widen this part of the web so that the total width, radially of the shoe, on a radial line through opening 20, is at least as great as the width of the web below and above opening 20.

At its upper end the shoe is shown provided with cam-engaging thrust rollers 22 on a pivot pin 24, the end of web 12 preferably being reinforced by separate plates or stampings 26 spot-welded or otherwise secured to opposite sides of the web, the center of pin 24 being held by the relatively long bearing provided by alined openings in web 12 and plates 26. The central part of pin 24 is of relatively great diameter, for a distance equal to the combined thickness of web 12 and plates 26, so that rollers 22 hold the pin 24 against axial movement, while the ends of pin 24 are headed over (on washers 28 if desired) to hold the rollers 22 against axial movement.

At the lower end of the shoe, web 12 is continued as an integral projecting arm 30, at the extreme end of which is arranged a bushing 32 for the pivot or anchor on which the shoe is mounted. Various important features of the invention relate to reinforcing this arm against the crushing and buckling strains to which the shoe is subjected, and which reach a maximum approximately midway between the pivot or anchor (i. e. bushing 32) and the end of the friction face of the shoe.

I prefer to reinforce the outer edge of arm 30 by arc-welding or otherwise securing thereto a narrowed integral extension 34 of band 10, this extension being shown as provided with integral side wings 36 bent into supporting engagement with the sides of arm 30, and if desired arc-welded thereto.

The inner edge of arm 30 is preferably provided with auxiliary reinforcing means extending lengthwise of the arm, and which may advantageously take the form of an integral rib 38 embossed or pressed into the metal of the arm along its inner edge. Rib 38 is shown as being long enough to extend from adjacent bushing 32, at one end, past the end of the friction face of the shoe, at the other end.

While one illustrative embodiment has been described in detail, it is not my intention to limit the scope of the invention to that particular embodiment, or otherwise than by the terms of the appended claims.

I claim:

1. A brake shoe comprising an outer arcuate band and a separate stiffening web secured to the inner face of said band and extended at one end of the shoe as an integral projecting arm, the arcuate band being integrally continued as a narrowed extension secured to the outer edge of said band.

2. A brake shoe comprising an outer arcuate band and a separate stiffening web secured to the inner face of said band and extended at one end of the shoe as an integral projecting arm, the arcuate band being integrally continued as a narrowed extension secured to the outer edge of said band and having at least at one side an integral wing extending into supporting engagement with the side of said arm.

3. A brake shoe comprising an outer arcuate band and a separate stiffening web secured to the inner face of said band and extended at one end of the shoe as an integral projecting arm, the arcuate band being integrally continued as a narrowed extension secured to the outer edge of said band and having at its sides integral wings extending into supporting engagement with both sides of said arm.

4. A brake shoe comprising an outer arcuate band and a separate stiffening web secured to the inner face of said band and extended at one end of the shoe as an integral projecting arm, the arcuate band being integrally continued as a narrowed extension secured to the outer edge of said band, said arm being provided with auxiliary reinforcing means adjacent its inner edge.

5. A brake shoe comprising an outer arcuate band and a separate stiffening web secured to the inner face of said band and extended at one end of the shoe as an integral projecting arm, the arcuate band being integrally continued as a narrowed extension secured to the outer edge of said band, said arm having a reinforcing rib extending lengthwise of the arm opposite said narrowed extension.

6. A brake shoe having an outer arcuate band and a stiffening web secured thereto and formed with an opening for the anchor of an adjacent shoe, the metal of the web on opposite sides of the opening radially of the shoe totalling at least as great a width as the radial width of the web at the side of the opening.

7. A brake shoe having an arcuate friction face and a stiffening web, separate plates or stampings secured to opposite sides of the web immediately adjacent its end, a pin having its central part mounted in the web and said plates and projecting on opposite sides of the shoe, and a pair of thrust rollers respectively mounted on the ends of said pin.

8. A brake shoe having an arcuate friction face and a stiffening web, separate plates or stampings secured to opposite sides of the web immediately adjacent its end, a pin having a central part with a relatively great diameter and with a length equal to the combined thickness of the web and plates and mounted in the web and said plates and projecting on opposite sides of the shoe, and a pair of thrust rollers respectively mounted on the ends of said pin and engaging the sides of said central part to hold the pin against axial movement.

9. A brake shoe having an arcuate friction face and a stiffening web, separate plates or stampings secured to opposite sides of the web immediately adjacent its end, a pin having a central part with a relatively great diameter and with a length equal to the combined thickness of the web and plates and mounted in the web and said plates and projecting on opposite sides of the shoe, and a pair of thrust rollers respectively mounted on the ends of said pin and engaging the sides of said central part to hold the pin against axial movement, the ends of the pin being headed over to hold the rollers against axial movement.

10. A brake shoe having an arcuate outer portion and a stiffening web projecting at one end of the shoe as an integral arm, the web having near the other end of the shoe a first opening for the attachment of a return spring and a second opening for a steady rest arranged between the first opening and the arcuate outer portion.

11. A brake shoe comprising an outer arcuate portion forming a cylindrical friction face and having a stiffening web therefor integrally extended as a projecting arm at one end of the shoe beyond said friction face and within the curve of said friction face, said stiffening web being provided with reinforcing means extending lengthwise of the shoe adjacent the edge of said web opposite the friction face and commencing approximately opposite the end of the friction face and extending toward the end of the shoe along the projecting arm.

12. A brake shoe comprising an outer arcuate portion forming a cylindrical friction face and having a stiffening web therefor integrally extended as a projecting arm at one end of the shoe beyond said friction face and within the curve of said friction face, said stiffening web being provided with reinforcing means extending lengthwise of the shoe and commencing approximately opposite the end of the friction face and extending toward the end of the shoe along the projecting arm.

13. A brake shoe comprising an outer arcuate portion forming a cylindrical friction face and having a stiffening web therefor integrally extended as a projecting arm at one end of the shoe beyond said friction face and within the curve of said friction face, said stiffening web being provided with a reinforcing rib extending lengthwise of the shoe adjacent the edge of said web opposite the friction face and commencing approximately opposite the end of the friction face and extending toward the end of the shoe along the projecting arm.

14. A brake shoe comprising an outer arcuate portion forming a cylindrical friction face and having a stiffening web therefor integrally extended as a projecting arm at one end of the shoe beyond said friction face and within the curve of said friction face, said stiffening web being provided with a reinforcing rib extending lengthwise of the shoe and commencing approximately opposite the end of the friction face and extending toward the end of the shoe along the projecting arm.

15. A brake shoe comprising an outer arcuate portion forming a cylindrical friction face and having a stiffening web therefor integrally extended as a projecting arm at one end of the shoe beyond said friction face and within the curve of said friction face, said stiffening web being provided with a reinforcing rib extending lengthwise of the shoe adjacent the edge of said web opposite the friction face and commencing approximately opposite the end of the friction face and extending toward the end of the shoe along the projecting arm, the shoe being of pressed sheet metal and the rib being embossed in the metal of the web.

In testimony whereof, I have hereunto signed my name.

ADIEL Y. DODGE.